United States Patent [19]
Wang

[11] Patent Number: 5,722,682
[45] Date of Patent: Mar. 3, 1998

[54] FOLDABLE TWO-SEATER STROLLER

[76] Inventor: Morgan Wang, 12F, No. 311, Fuhsing N. Rd., Taipei City, Taiwan

[21] Appl. No.: 669,816

[22] Filed: Jun. 27, 1996

[51] Int. Cl.[6] .................................................. B62B 7/06
[52] U.S. Cl. ............................................ 280/642; 280/650
[58] Field of Search .................................... 280/642, 643, 280/650, 658; 297/16.2

[56] References Cited

U.S. PATENT DOCUMENTS

| | | | |
|---|---|---|---|
| 1,807,235 | 5/1931 | Brown | 280/643 |
| 2,989,318 | 6/1961 | Schenkman | 280/643 |
| 4,858,947 | 8/1989 | Yee et al. | 280/643 |
| 4,966,379 | 10/1990 | Mulholland | 280/650 |
| 5,417,450 | 5/1995 | Wang | 280/642 |
| 5,622,376 | 4/1997 | Shamie | 280/642 |

FOREIGN PATENT DOCUMENTS

| | | | |
|---|---|---|---|
| 8502154 | 5/1985 | WIPO | 280/650 |

*Primary Examiner*—Thomas J. Brahan
*Attorney, Agent, or Firm*—Christie, Parker & Hale, LLP

[57] ABSTRACT

A foldable two-seater stroller includes a U-shaped seat frame, front and rear backrest members mounted to the seat frame. Two rear reclining adjuster units and two front reclining adjuster units are connected respectively to the lower ends of the front and rear backrest members. Front and rear legs are connected pivotally to the front and rear sections of the seat frame. A U-shaped handrail member is connected pivotally to the upper ends of the front legs. A pair of middle connecting rods are connected pivotally to the intermediate sections of the handrail member and the seat frame. A pair of rear connecting rods are connected pivotally to the rear sections of the handrail member and the seat frame. An inverted U-shaped handle unit is connected pivotally to the middle connecting rods by means of coupling members. The intermediate sections of the handle unit are connected pivotally to the upper ends of the rear legs.

3 Claims, 6 Drawing Sheets

FOLDABLE TWO-SEATER STROLLER

BACKGROUND OF THE INVENTION

1. Field of the Invention

This invention relates to a two-seater stroller, more particularly to a two-seater stroller which can be folded backward.

2. Description of the Related Art

Presently, various types of foldable strollers, such as foldable single-seater strollers, foldable two-seater strollers are available in the market. The foldable two-seater strollers are designed to be folded toward to the front of the strollers. That is, the handle unit of the foldable two-seater stroller is pushed forward during the folding process. There are no foldable two-seater strollers which can be folded toward the rear of the strollers.

SUMMARY OF THE INVENTION

It is therefore a main object of the present invention to provide a foldable two-seater stroller which can be folded backward.

Accordingly, the foldable two-seater stroller of the present invention comprises:

a U-shaped seat frame having a pair of forward extending arms, each of the forward extending arms having a front section, a rear section, and an intermediate section interconnecting the front and rear sections;

a pair of front legs, each of which has an upper end, an intermediate portion, and a lower end, each of the intermediate portions of the front legs being connected pivotally to the front section of a respective one of the forward extending arms, the lower end of each of the front legs having a front wheel connected thereto;

a pair of rear legs, each of which has an upper end, an intermediate portion, and a lower end, each of the intermediate portions of the rear legs being connected pivotally to the rear section of a respective one of the forward extending arms, the lower end of each of the rear legs having a rear wheel connected thereto;

a U-shaped handrail member having a pair of backward extending arms and a front guardrail interconnecting the backward extending arms, each of the backward extending arms having a front section, a rear section, and an intermediate section interconnecting the front and rear sections of the backward extending arms, each of the upper ends of the front legs being pivotally connected adjacent to the front section of a respective one of the backward extending arms;

a pair of middle connecting rods, each of the middle connecting rods having an upper end portion which is connected pivotally to the intermediate section of a respective one of the backward extending arms at an upper pivot point and a lower end portion which is connected pivotally to the intermediate section of a respective one the forward extending arms, each of the middle connecting rods further having a coupling member fixed thereto at a respective one of the upper pivot points;

a pair of front connecting rods, each of the front connecting rods having an upper end portion which is connected pivotally to a respective one of the backward extending arms between the upper end of a respective one of the front legs and the upper end portion of a respective one of the middle connecting rods, each of the front connecting rods further having a lower end portion which is connected pivotally to a respective one of the forward extending arms between the intermediate section of a respective one of the front legs and the lower end portion of a respective one of the middle connecting rods;

a pair of rear connecting rods, each of the rear connecting rods having an upper end portion which is connected pivotally to the rear section of a respective one of the backward extending arms and a lower end portion which is connected pivotally to the rear section of a respective one of the forward extending arms;

an inverted U-shaped handle unit having two downward extending arms, each of the downward extending arms having a lower section which is spaced parallelly behind the upper end portion of a respective one of the middle connecting rods, the lower section of each of the downward extending arms having a lower end which is connected pivotally to a respective one of the coupling members, each of said downward extending arms further having an intermediate section which is connected pivotally to the upper end of a respective one of the rear legs; and inverted U-shaped front and rear backrest members mounted respectively to front and rear sections of said seat frame.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
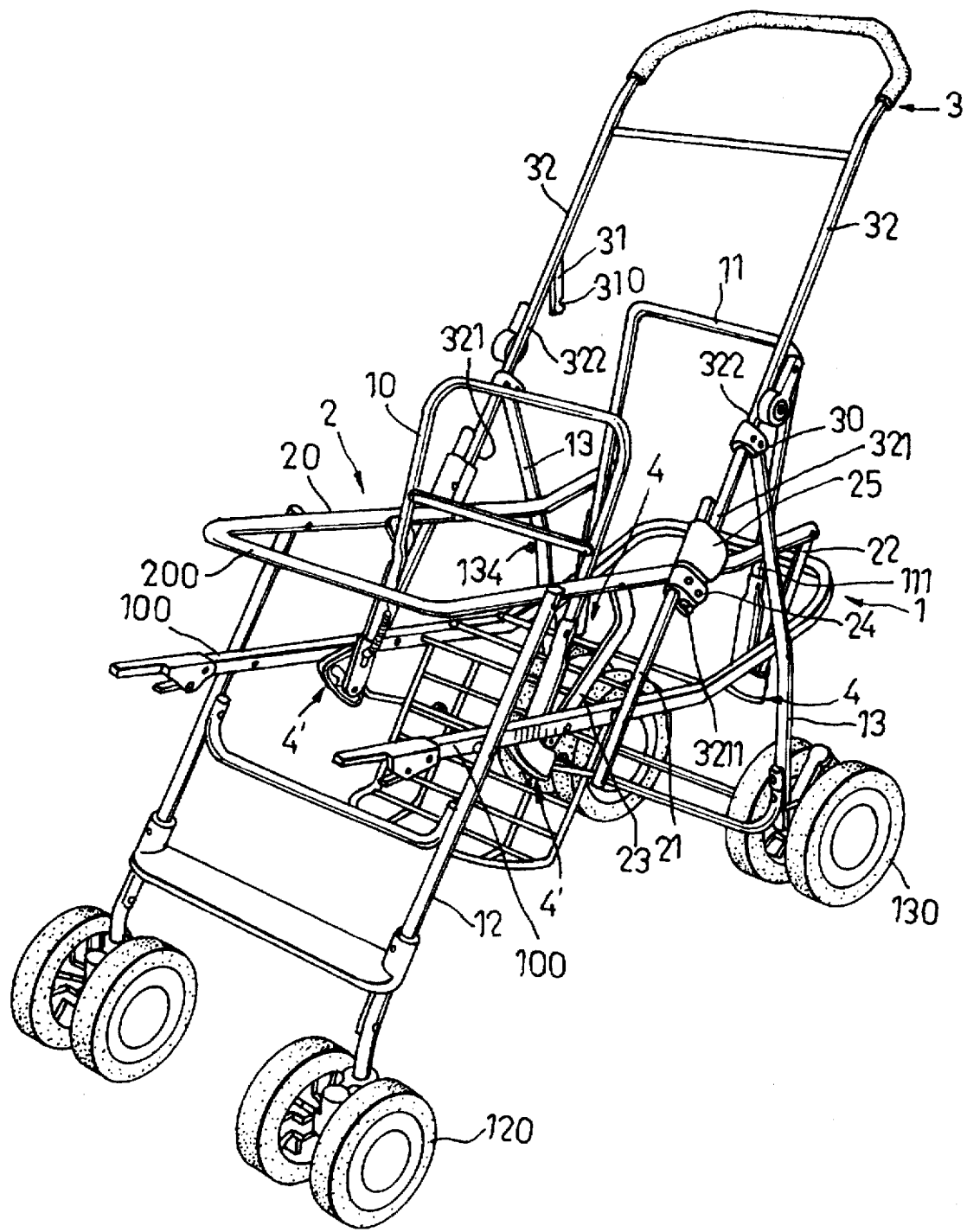
FIG. 1 is a perspective view of a preferred embodiment of a foldable two-seater stroller according to the present invention.
Figure 2:
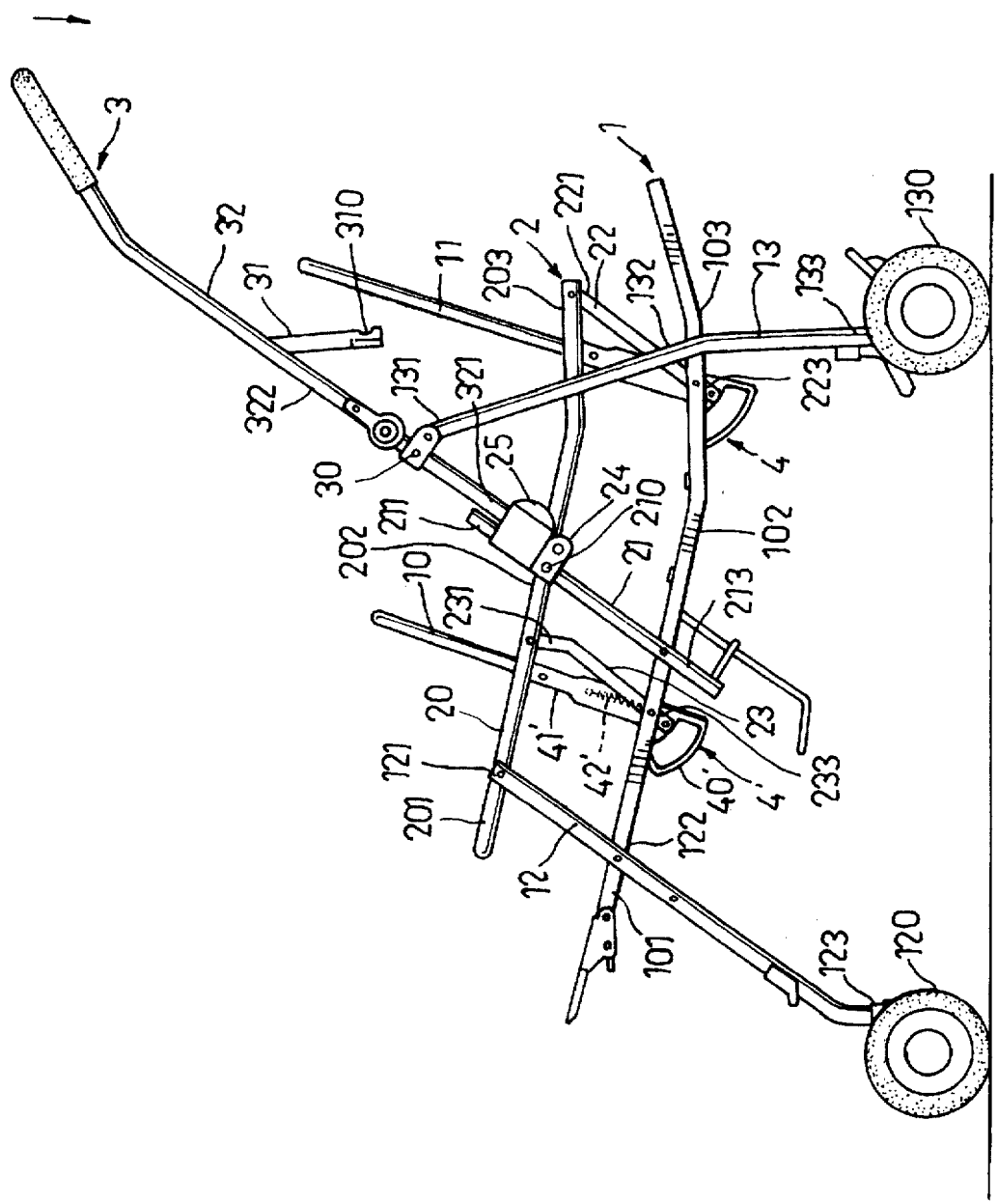
FIG. 2 is a side view of the preferred embodiment of the foldable two-seater stroller according to the present invention.

Referring to FIGS. 1 and 2, a preferred embodiment of a foldable two-seater stroller is shown to comprise a U-shaped seat frame 1, a U-shaped handrail member 2, an inverted U-shaped handle unit 3, two rear reclining adjuster means 4 and two front reclining adjuster means 4'.

The seat frame 1 has a pair of forward extending arms 100. Each of the forward extending arms 100 has a front section 101, a rear section 103, and an intermediate section 102 interconnecting the front and rear sections 101, 103. Inverted U-shaped front and rear backrest members 10, 11 are mounted respectively to front and rear sections 101, 103 of said seat frame 1. The front and rear backrest members 10, 11 can be provided with upholstery so that babies can be seated comfortably thereon. A pair of front legs 12 and a pair of rear legs 13 are mounted respectively to the front and rear sections 101, 103 of the seat frame 1. Specifically, each of the front legs 12 has an upper end 121, an intermediate portion 122, and a lower end 123. Each of the intermediate portions 122 of the front legs 12 is connected pivotally to the front section 101 of a respective one of the forward extending arms 100. The lower end 123 of each of the front legs 12 has a front wheel 120 connected thereto. Each of the rear legs 13 has an upper end 131, an intermediate portion 132, and a lower end 133. Each of the intermediate portions 132 of the rear legs 13 is connected pivotally to the rear section 103 of a respective one of the forward extending arms 100. The lower end 133 of each of the rear legs 13 has a rear wheel 130 connected thereto. A pillar 134 is provided on one of the intermediate sections 132 of the rear legs 13.

The handrail member 2 has a pair of backward extending arms 20 and a front guardrail 200 interconnecting the backward extending arms 20. Each of the backward extending arms 20 has a front section 201, a rear section 203, and an intermediate section 202 interconnecting the front and rear sections 201, 203 of the backward extending arms 20. Each of the upper ends 121 of the front legs 12 is pivotally connected adjacent to the front section 201 of a respective one of the backward extending arms 20.

A pair of middle connecting rods 21 are mounted respectively to the intermediate sections 202 of handrail member 2. More specifically, each of the middle connecting rods 21 has an upper end portion 211 which is connected pivotally to the intermediate section 202 of a respective one of the backward extending arms 20 at an upper pivot point 210 and a lower end portion 213 which is connected pivotally to the intermediate section 102 of a respective one the forward extending arms 100. Each of the middle connecting rods 21 further has a coupling member 24 fixed thereto at a respective one of the upper pivot points 210 by means of a rivet pin. Each of the middle connecting rods 21 has a rotatable retaining member 25 with a retaining groove 251 (see FIG. 4) mounted above the respective one of the coupling members 24.

A pair of front connecting rods 23 are mounted respectively to the intermediate sections 202 of the handrail member 2 between the front legs 12 and the middle connecting rods 21. In this case, each of the front connecting rods 23 has an upper end portion 231 which is connected pivotally to a respective one of the backward extending arms 20 between the upper end 121 of a respective one of the front legs 12 and the upper end portion 211 of a respective one of the middle connecting rods 21. Each of the front connecting rods 23 further has a lower end portion 233 which is connected pivotally to a respective one of the forward extending arms 100 between the intermediate section 122 of a respective one of the front legs 12 and the lower end portion 213 of a respective one of the middle connecting rods 21.

A pair of rear connecting rods 22 are mounted respectively to the rear sections 203 of the handrail member 2. Particularly, each of the rear connecting rods 22 has an upper end portion 221 which is connected pivotally to the rear section 203 of a respective one of the backward extending arms 20 and a lower end portion 223 which is connected pivotally to the rear section 103 of a respective one of the forward extending arms 100.

The inverted U-shaped handle unit 3 has two downward extending arms 32. Each of the downward extending arms 32 has a lower section 321 which is spaced parallelly behind the upper end portion 211 of a respective one of the middle connecting rods 21. The lower section 321 of each of the downward extending arms 32 has a lower end 321 which is connected pivotally to a respective one of the coupling members 24. Each of the downward extending arms 32 further has an intermediate section 322 which is connected pivotally to the upper end 131 of a respective one of the rear legs 13 by means of a coupling member 30. The intermediate section 322 of one of the downward extending arms 32 has an elongated retaining plate 31 with a hook end 310 which is connected rotatably thereto and is adapted to engage a corresponding one of the retaining grooves 251 of the rotatable retaining members 25 in order to hold the handle unit 3 in position. The hook end 310 of the retaining plate 31 may engage the pillar 14 in order to hold the two-seater stroller in a folded position when the stroller is folded.

Figure 3:
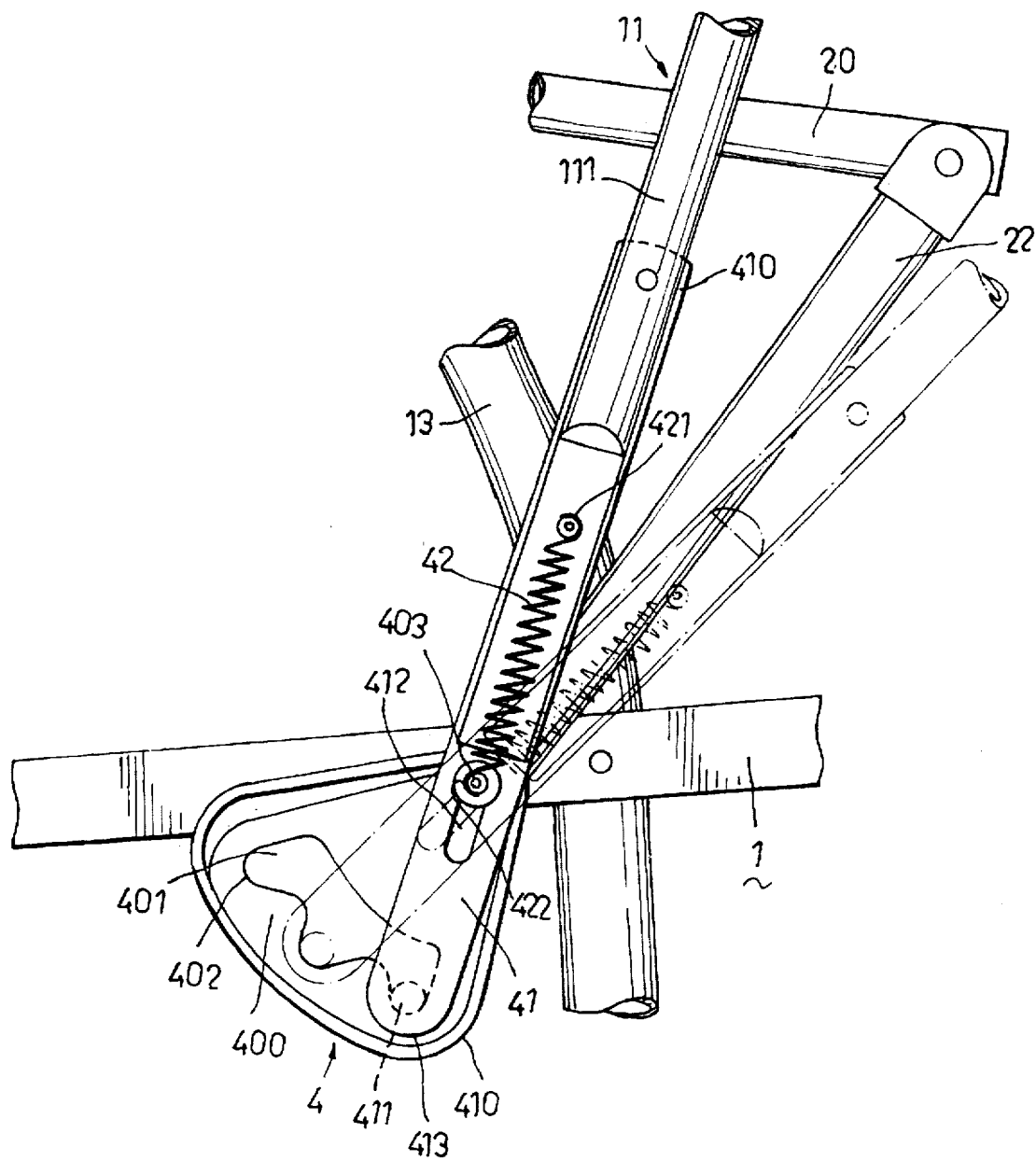
FIG. 3 is an enlarged schematic view illustrating how a rear reclining adjuster means is connected to a rear backrest member and a rear connecting rod of the foldable two-seater stroller according to the present invention.

Referring to FIGS. 2, 3, each of the rear reclining adjuster means 4 is mounted to the lower end portion 223 of a corresponding one of the rear connecting rods 22 and comprises a positioning plate 40, a coupling rod 41 and an elastic member 42. The positioning plate 40 of each of the rear reclining adjuster means 4 has an inside face 400 and is fixed to the lower end portion 223 of the respective one of the rear connecting rods 22 such that the positioning plates 40 are parallel with one another with the inside faces 400 opposed to one another. The inside face 400 of each of the positioning plates 40 has an elongated cavity 401 extending in a direction from the front portion to the rear portion of the two-seater stroller and a projection stud 403 which is formed above the cavity 401. The cavity 401 of each of the positioning plates 40 has a corrugated lower periphery, thereby defining three arcuate recesses 402 along the lower periphery. The coupling rod 41 of each of the rear reclining adjuster means 4 has an upper end 410 which is fixed to the respective one of the lower ends 111 of the rear backrest member 11, a lower end 413, a protrusion 411 which is formed on the lower end 413 and which is retained in one of the recesses 402 of a corresponding one of the cavities 401, and an elongated longitudinal slot 412 which is formed between the upper and lower ends 410, 413 of the coupling rod 41. The projection stud 403 of each of the positioning plates 40 are received slidably in the longitudinal slot 412 of a corresponding one of the coupling rods 41 so that the corresponding one of the coupling rods 41 is movable relative to the projection stud 403 between a first position, wherein the protrusion 411 of each of the coupling rods 41 engages one of the recesses 402 and a second position, wherein the protrusion 411 is disengaged from the one of the recesses 402. The elastic member 42 of each of the rear reclining adjuster means 4 has a upper end 421 which is fixed to a respective one of the lower ends 111 of the rear backrest member 11 and a lower end 422 which is connected to the projection stud 403 of a respective one of the positioning plates 40 in order to urge the corresponding one of the coupling rods 41 to move to the first position, whereby the protrusions 411 of the coupling rods 41 can be retained in a selected one of the recesses 402 in order to position the rear backrest member 11 at a selected inclination angle. When the selected inclination angle is to be changed, the user may pull the rear backrest member 11 upwardly against the resilient force of the elastic members 42 in order to permit the coupling rods 41 to move to their second positions, push the rear backrest member 11 rearward and downward to allow the protrusions 411 to align the adjacent recesses 402, and then release the rear backrest member 11 in order to permit the protrusions 411 to engage the adjacent recesses 402, as shown by the phantom lines of FIG. 3.

Each of the front reclining adjuster means 4' is mounted to the lower end 233 of a respective one of the front connecting rods 23, as best illustrated in FIG. 2. The structures of the front reclining adjuster means 4' is the same as those of the rear reclining adjuster means 4, which will not be detailed further hereinbelow. However, the connecting rods 41' of the front reclining adjuster means 4' are used to interconnect the positioning plates 40' and the front backrest member 10 and the upper ends of the elastic members 42' of the front reclining adjuster means 4' are fixed to the front backrest member 10. Therefore, the front reclining adjuster means 4' can be used to position the front backrest member 10 with respect to the seat frame 1 at a selected inclination angle in an aforementioned manner.

Figure 4:
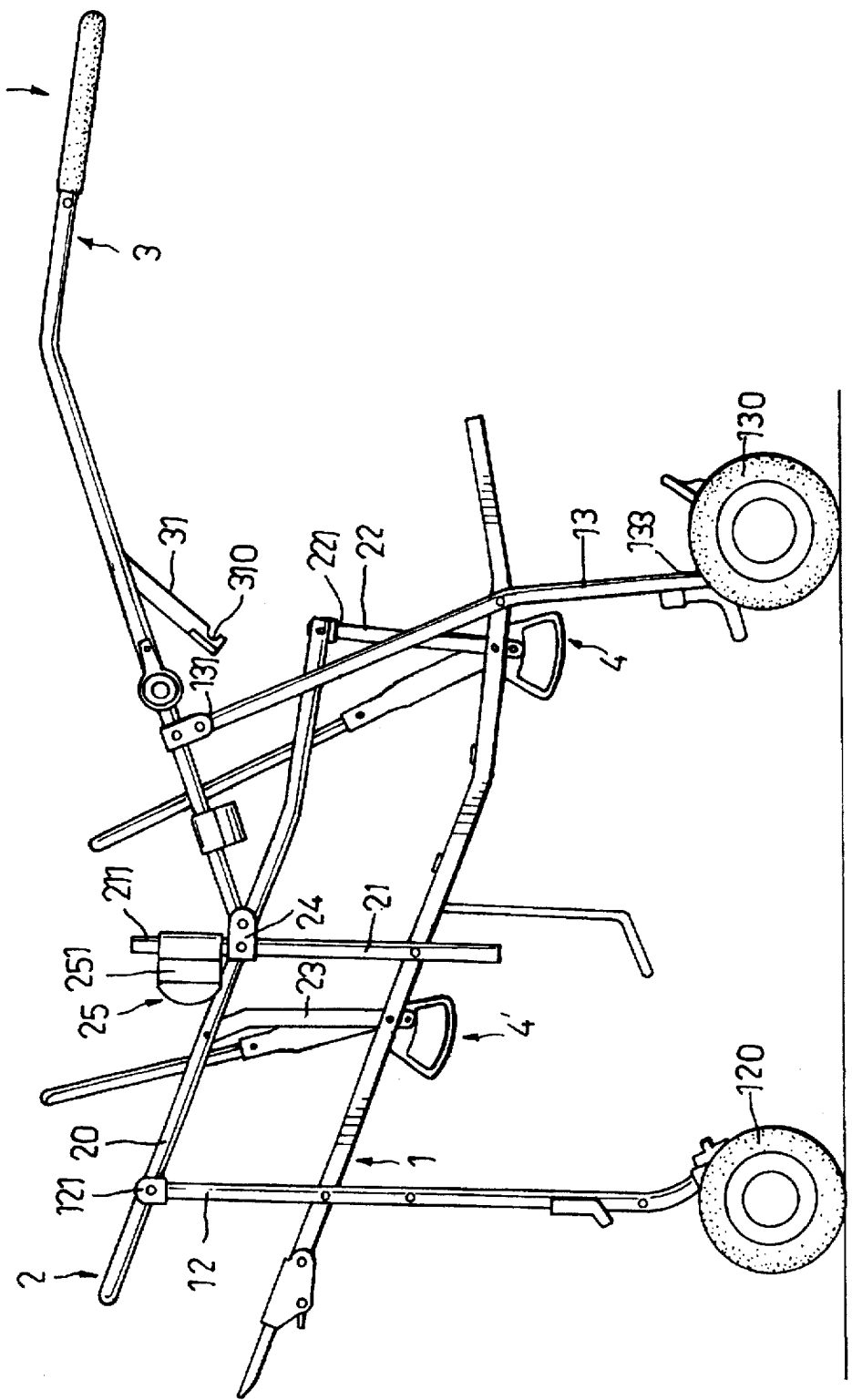
FIG. 4 is a schematic side view illustrating the foldable two-seater stroller of the present invention in a partially folded position.
Figure 5:
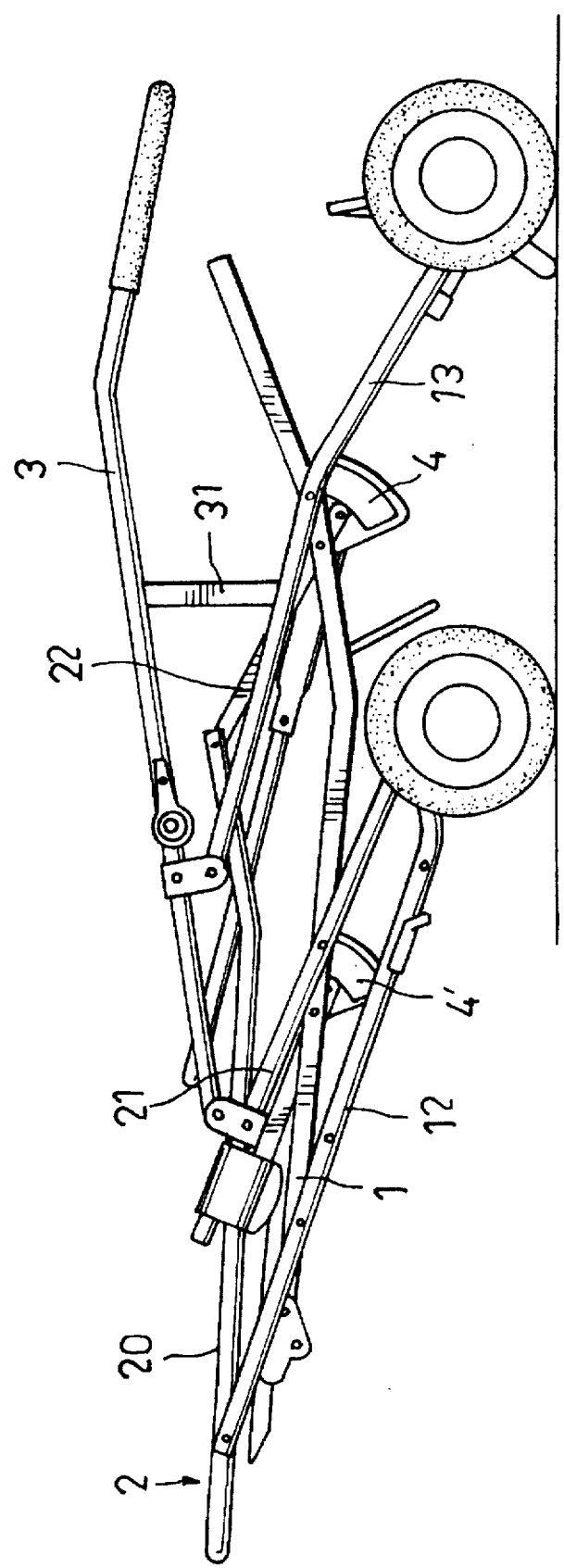
FIG. 5 is a schematic side view illustrating the foldable two-seater stroller of the present invention in a fully folded position.

When the two-seater stroller is to be folded, the rotatable retaining members 25 are rotated so as to permit the retaining grooves 251 to disengage from the handle unit 3. The upper portion of the handle unit 3 is then pushed downward and rearward. The upper ends 131 of the rear legs 13 is swung forward and downward while the lower ends 133 of the rear legs 13 and the rear wheels 130 are moved rearward. At this time, the seat frame 1, handrail member 2, the upper end portions 211 of the middle connecting rods 21, the upper end portions 221 of the rear connecting rods 22 and the upper ends 121 of the front legs 12 will be swung forward and upward. Therefore, the front legs 12, the middle connecting rods 21, the rear connecting rods 22 can be changed from an inclined state into a generally vertical state, as best illustrated in FIG. 4. When the upper portion of the handle unit 3 is further pushed downward, the front legs 12, the middle connecting rods 21, and the rear connecting rods 22 will be inclined forward until the two-seater stroller is fully folded, as best illustrated in FIG. 5.

Figure 6:
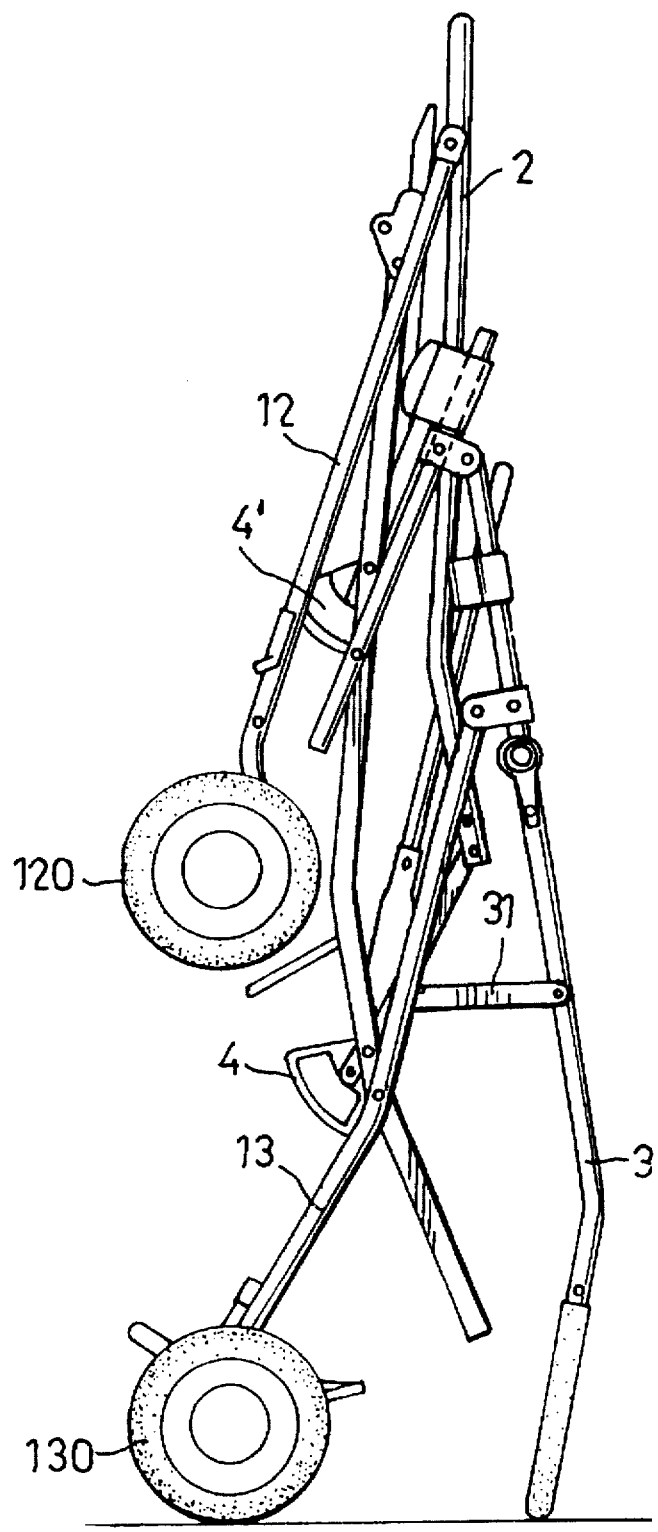
FIG. 6 is a schematic side view illustrating how the foldable two-seater stroller of FIG. 5 stands on its handle unit and rear wheels according to the present invention.

When the stroller is fully folded, the hook end 310 of the retaining plate 31 may engage the pillar 14 in order to hold the two-seater stroller in the folded position. In addition, the folded two-seater stroller may stand on its rear wheels 130 and the handle unit 3 on the ground in order to reduce the ground area for storing the two-seater stroller, as best illustrated in FIG. 6.

It is noted that with the above-mentioned structures, the two-seater stroller of the present invention can be folded backward. The object of the present invention is thus met. In addition, because the components of the front and rear reclining adjuster means 4, 4' are the same, only one set of molds are required to manufacture the front and rear reclining adjuster means 4, 4'. Therefore, the manufacturing cost can be reduced.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

I claim:

1. A foldable two-seater stroller, comprising:

a U-shaped seat frame having a pair of forward extending arms, each of said forward extending arms having a front section, a rear section, and an intermediate section interconnecting said front and rear sections;

a pair of front legs, each of which has an upper end, an intermediate portion, and a lower end, each of said intermediate portions of said front legs being connected pivotally to said front section of a respective one of said forward extending arms, said lower end of each of said front legs having a front wheel connected thereto;

a pair of rear legs, each of which has an upper end, an intermediate portion, and a lower end, each of said intermediate portions of said rear legs being connected pivotally to said rear section of a respective one of said forward extending arms, said lower end of each of said rear legs having a rear wheel connected thereto;

a U-shaped handrail member having a pair of backward extending arms and a front guardrail interconnecting said backward extending arms, each of said backward extending arms having a front section, a rear section, and an intermediate section interconnecting said front and rear sections of said backward extending arms, each of said upper ends of said front legs being pivotally connected adjacent to said front section of a respective one of said backward extending arms;

a pair of middle connecting rods, each of said middle connecting rods having an upper end portion which is connected pivotally to said intermediate section of a respective one of said backward extending arms at an upper pivot point and a lower end portion which is connected pivotally to said intermediate section of a respective one said forward extending arms, each of said middle connecting rods further having a coupling member fixed thereto at a respective one of said upper pivot points;

a pair of front connecting rods, each of said front connecting rods having an upper end portion which is connected pivotally to a respective one of said backward extending arms between said upper end of a respective one of said front legs and said upper end portion of a respective one of said middle connecting rods, each of said front connecting rods further having a lower end portion which is connected pivotally to a respective one of said forward extending arms between said intermediate section of a respective one of said front legs and said lower end portion of a respective one of said middle connecting rods;

a pair of rear connecting rods, each of said rear connecting rods having an upper end portion which is connected pivotally to said rear section of a respective one of said backward extending arms and a lower end portion which is connected pivotally to said rear section of a respective one of said forward extending arms;

an inverted U-shaped handle unit having two downward extending arms, each of said downward extending arms having a lower section which is spaced parallelly behind said upper end portion of a respective one of said middle connecting rods, said lower section of each of said downward extending arms having a lower end which is connected pivotally to a respective one of said coupling members, each of said downward extending arms further having an intermediate section which is connected pivotally to said upper end of a respective one of said rear legs;

an inverted U-shaped front backrest member having two lower ends;

an inverted U-shaped rear backrest member having two lower ends;

two front reclining adjuster means for positioning said front backrest member with respect to said seat frame at a selected inclination angle, each of said front reclining adjuster means interconnecting a respective one of said lower ends of said front backrest member and said lower end portion of a respective one of said front connecting rods; and two rear reclining adjuster means for positioning said rear backrest member with respect to said seat frame at a selected inclination angle, each of said rear reclining adjuster means interconnecting a respective one of said lower ends of said rear backrest member and said lower end portion of a respective one of said rear connecting rods.

2. A foldable two-seater stroller as claimed in claim 1, wherein each of said front reclining adjuster means comprises a positioning plate, a coupling rod and an elastic member, said positioning plate of each of said front reclining adjuster means having an inside face and being fixed to said lower end portion of the respective one of said front connecting rods such that said positioning plates are parallel with one another with said inside faces opposed to one another, said inside face of each of said positioning plates having an elongated cavity extending in a direction from a front portion to a rear portion of said two-seater stroller and a projection stud formed above said cavity, said cavity of each of said positioning plates having a corrugated lower periphery, thereby defining a plurality of erect recesses along said lower periphery, said coupling rod of each of said front reclining adjuster means having an upper end which is fixed to the respective one of said lower ends of said front backrest member, a lower end, a protrusion which is formed on said lower end thereof and which is retained in one of said recesses of a corresponding one of said cavities, and an elongated longitudinal slot formed between said upper and lower ends of said coupling rod, said projection stud of each of said positioning plates being received slidably in said longitudinal slot of a corresponding one of said coupling rods so that the corresponding one of said coupling rods is movable relative to said projection stud between a first position, wherein said protrusion of each of said coupling rods engages one of said recesses and a second position, wherein said protrusion is disengaged from said one of said recesses, said elastic member of each of said front reclining adjuster means having a upper end which is fixed to a respective one of said lower ends of said front backrest member and a lower end which is connected to said projection stud of a respective one of said positioning plates in order to urge the corresponding one of said coupling rods to move to said first position, whereby said protrusions of said coupling rods can be normally retained in a selected one of said recesses in order to position said front backrest member at the selected inclination angle.

3. A foldable two-seater stroller as claimed in claim 1, wherein each of said rear reclining adjuster means comprises a positioning plate, a coupling rod and an elastic member, said positioning plate of each of said rear reclining adjuster means having an inside face and being fixed to said lower end portion of the respective one of said rear connecting rods such that said positioning plates are parallel with one another with said inside faces opposed to one another, said inside face of each of said positioning plates having an elongated cavity extending in a direction from a front portion to a rear portion of said two-seater stroller and a projection stud formed above said cavity, said cavity of each of said positioning plates having a corrugated lower periphery, thereby defining a plurality of arcuate recesses along said lower periphery, said coupling rod of each of said rear reclining adjuster means having an upper end which is fixed to the respective one of said lower ends of said rear backrest member, a lower end, a protrusion which is formed on said lower end thereof and which is retained in one of said recesses of a corresponding one of said cavities, and an elongated longitudinal slot formed between said upper and lower ends of said coupling rod, said projection stud of each of said positioning plates being received slidably in said longitudinal slot of a corresponding one of said coupling rods so that the corresponding one of said coupling rods is movable relative to said projection stud between a first position, wherein said protrusion of each of said coupling rods engages one of said recesses and a second position, wherein said protrusion is disengaged from said one of said recesses, said elastic member of each of said rear reclining adjuster means having a upper end which is fixed to a respective one of said lower ends of said rear backrest member and a lower end which is connected to said projection stud of a respective one of said positioning plates in order to urge the corresponding one of said coupling rods to move to said first position, whereby said protrusions of said coupling rods can be normally retained in a selected one of said recesses in order to position said front backrest member at the selected inclination angle.

\* \* \* \* \*